H. H. MONROE.
Broadcast Seeder.
No. 198,750. Patented Jan. 1, 1878.
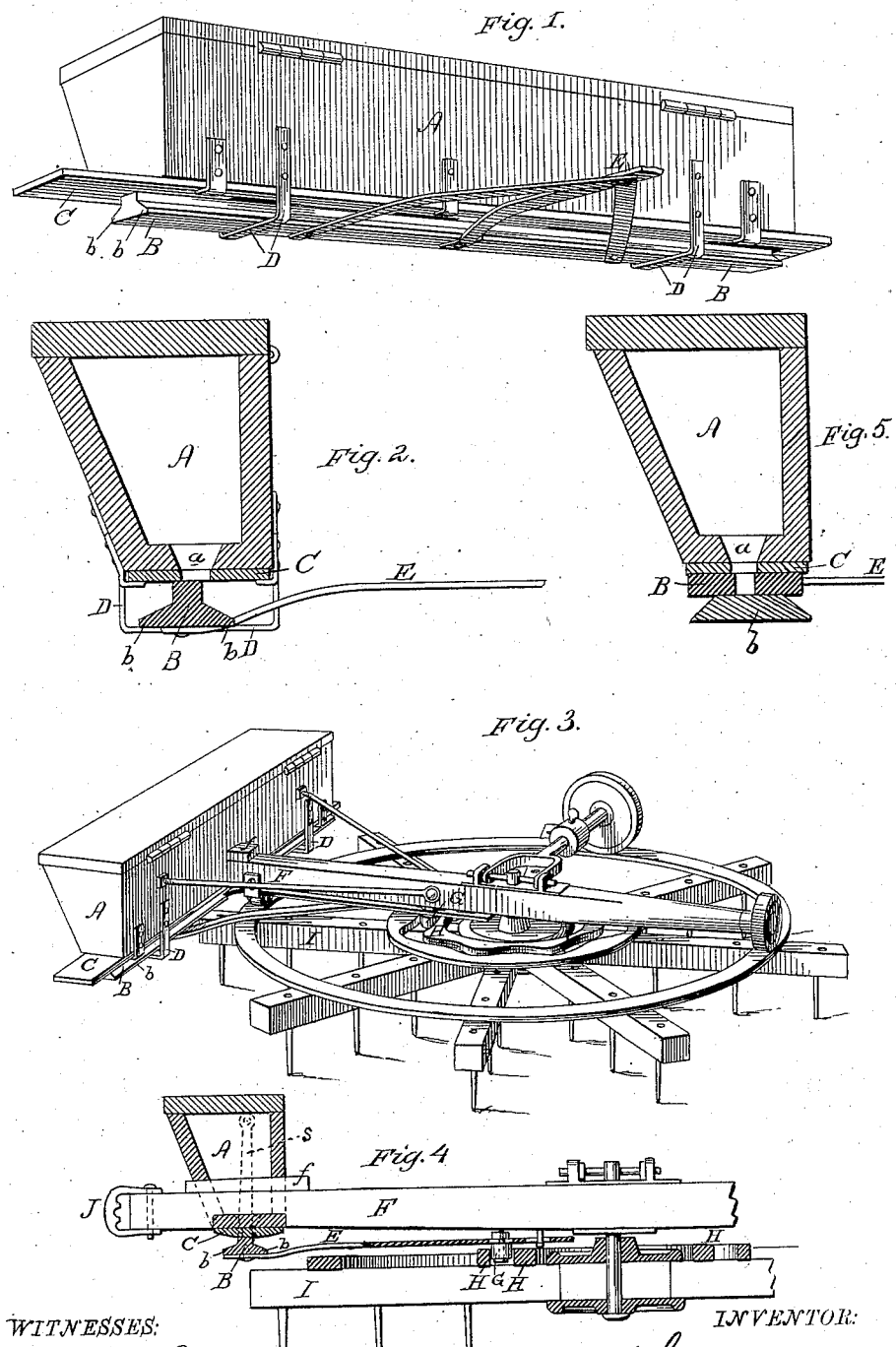

UNITED STATES PATENT OFFICE.

HALSEY H. MONROE, OF THOMASTON, MAINE.

IMPROVEMENT IN BROADCAST-SEEDERS.

Specification forming part of Letters Patent No. 198,750, dated January 1, 1878; application filed December 7, 1877.

*To all whom it may concern:*

Be it known that I, HALSEY H. MONROE, of Thomaston, Knox county, Maine, have invented new and useful Improvements in Seed-Planting Machines; and that the following is a full and exact description thereof.

This invention relates to that class of seeders known as "broadcast," because the grain is distributed over the ground irrespective of regular lines. Heretofore, so far as I am aware, in machines of this class, the distributing devices, when reciprocatory, have always been in the form of a perforated slide in the bottom of the hopper, moving in lines lengthwise to the seed-hopper—*i. e.*, transverse to the line of draft. This structure and direction of motion involves a very large percentage of frictional resistance to be overcome by the driving power. Every diminution of resistance in a machine is equivalent to an increase in available power, and the principal object of my invention is to effect such diminution of friction and economy of power.

To remedy these objections I have discarded the slide moving lengthwise in the bottom of the hopper, and substituted therefor a valve or valves moving beneath the hopper and transverse to its length—*i. e.*, in the line of the machine's advance. This valve may be located below the lower surface of the hopper-bottom, and move without contact therewith. It moves across the valve-port, and discharges at each side alternately.

This arrangement presents several important advantages not heretofore obtained in seeding-machines of any class: First, the distributer reciprocates in the line of the machine's advance, and therefore the front and rear delivery may be adjusted to the rate of advance, so as to cover the ground uniformly, without alternate belts of thick and thin distribution; second, the location of the valve below the hopper, and the absence of frictional contact therewith, reduces the friction to the lowest point.

In utilizing my invention, I prefer to apply it in connection with a rotary harrow, as shown, though it is evident that, so far as the mechanical effects of my invention are concerned, it is entirely immaterial as to what kind of carriage it shall be attached, or what shall be the style of its motor. It may be mounted upon a wheeled sulky-frame, like an ordinary seed-drill, or upon a sliding or running frame, like some corn-planters, or upon a harrow, as shown.

Heretofore, in harrow-seeders, the seed-distributing devices have usually been driven by an independent wheel running upon the ground; but sometimes it has been proposed to drive the distributer by the rotation of the harrow itself upon a central pivot. The rotary harrow which I prefer is one which is circular, and provided with a weight upon one side, so as to cause the teeth at that side to penetrate more deeply and encounter more resistance than the teeth at the unweighted side.

The seed hopper or box is mounted upon the draft-beam, or elsewhere, if more convenient, and the seed-distributer valve is driven by the rotation of said harrow, and communicated by a cam, crank, or other well-known device, and a connecting-rod communicating directly with the said valve.

I am aware that a rotary harrow having a seed-box mounted thereon, and seed-distributers actuated by the harrow in its rotation, is not new, the same having been used in 1869, or earlier. Therefore, I do not claim that combination, broadly.

It is evident the rotary power of the harrow, acting simply from differential resistance to the passage of its teeth, must be feeble and unable to overcome any great amount of frictional resistances, and, therefore, it is necessary that the parts operated by said rotation must be reduced to the smallest attainable number, and must be adjusted to move with the least possible resistance; otherwise the delivery of the grain will be unsteady and deficient in uniformity.

My seed-distributing valve, reciprocating in the direction of the machine's advance, and therefore actuated directly and without frictional contact with the seed-box or hopper, is adapted to the feeble driving power of the rotary harrow.

My invention therefore relates to a seed-distributer consisting of a valve mounted beneath the hopper, and reciprocating without frictional contact therewith, and adjusted to deliver at each side alternately.

That others may fully understand my invention, I will particularly describe it, and the mode of attachment and operation in connection with a rotary harrow, having reference to the accompanying drawings, wherein—

Figure 1 is a perspective view of my seed-box or hopper detached, and capable of attachment to a conveying vehicle of any desirable kind. Fig. 2 is a vertical transverse section of the seed-hopper and distributer-valve. Fig. 3 is a perspective view of my seed-distributer attached to a rotary harrow. Fig. 4 is a transverse section, showing mode of connecting the hopper to the draft-beam. Fig. 5 is a transverse section, representing a modification in structure of valve B.

A is the seed-box or hopper, made of the ordinary material and size. The bottom of this box is perforated in long rectangular orifices $a$, through which the seed descends upon the distributer-valve B. The quantity of seed passing down through said orifices is controlled by the slide-valve C, located immediately below the bottom board, and capable of cutting off the flow of seed entirely, if moved to the proper position.

When the ports $a$ are opened, by the adjustment of the slide C, the grain descends and rests upon the valve B. When said valve is moved forward, so as to uncover the port, as at its rear edge, the grain will flow down upon that side of said valve, and when said valve is moved backward the front side of said port is uncovered with like effect.

The upper face of valve B is below the bottom of the slide C, and it is not required that it shall be adjusted so closely as to touch said bottom; therefore there cannot be any frictional contact to increase the sum of the general resistance. The valve B moves upon guides D, arranged below the hopper and independent of it.

In practice I find it convenient to attach said guides by means of straps to the sides of hopper, but do not propose to limit myself to that structure.

The resistance to the motion of the valve B is entirely in its bearing upon the guides D, and as these are narrow, and expose but little surface, the friction will be slight, and the tendency or ability to clog will be very small.

The valve B may be a single piece, extending from end to end of the hopper, as shown, and as I prefer; or it may be divided into as many separate parts as there are ports $a$ to be guarded. This will not involve any essential change in the principle of operation. The valve B is attached directly to the operative reciprocating rod or bar E, which transmits the alternating motion of the prime mover.

To effect the most complete scattering of the seed I construct the valve B with projecting flanges or platforms $b\ b$ along both edges at the bottom. The grain, as it issues from the port $a$, falls upon the flange or platform $b$, and is scattered therefrom. The fact that this platform or flange $b$ is attached to and moves with the valve makes it more efficacious in scattering the seed, and makes it impossible that any can lodge thereon.

The same effect may be produced by a platform unattached to the valve, and movable or otherwise; but it would be less simple.

It is important that the range of motion of the valve shall be reduced to the lowest possible quantity, and I therefore make the face of the valve of slightly less width than the width of the port, so that it will begin to open at one side the moment the other side has completely closed; but this structure is not essential. The valve may be wider than the port.

When my seed-distributer is employed with a rotary harrow, as shown, the bar E is actuated by a serpentine cam encircling the harrow-pivot. This cam may present an ordinary serpentine edge and move the rod in one direction only, while a spring of sufficient power moves it in the opposite direction, or it may be a serpentine groove, with a friction-roller on the rod traversing in said groove, and moving said rod positively in both directions. This latter method I prefer, and it is shown in the drawings. The rod E is fitted to run in suitable guides fixed to the bottom of the draft-beam F, and at its outer end there is a longitudinal slot, through which the pivot-bolt of the friction-roller G passes, and is adjustable therein, so as to regulate the position of the valve B with reference to the driving-cam H.

The cam H may be cast in a single piece, as above stated, with a plain serpentine edge, or with a serpentine groove; or it may be cast in two pieces of corresponding configuration, so that when separately secured to the arms of the harrow I, the intervening space will form the cam-groove.

The harrow I, I prefer to construct with radial arms, secured at their inner ends to a proper plate, having a pivot-bolt which runs up through the draft-beam F as a center of revolution for the harrow.

The precise configuration of the cam H may be varied to suit the desired movement of the valve B. The hopper A, I mount upon the draft-beam F by any convenient method; but the one which I prefer is as follows: Orifices are made in the sides of the box sufficiently large to admit the passage of the draft-beam, and on its lower side said beam has a notch wide enough to receive the edges of the hopper, so that when the box is in place, and a key, $f$, is driven through the openings above the beam F, it will be perfectly locked to said beam, and cannot become displaced unless the said key is first removed. Brace-rods R R may also be employed to stiffen the connection of the box or hopper.

The valve B may be set so as to discharge from one side only, if desired, by shifting the position of the roller G on the rod E. The draft-team is attached, at the front end of the beam F, to the clevis J.

It will appear evident that the valve B may be mounted in a variety of ways—as, for instance, it may be mounted upon pivoted swinging arms s, as shown in Fig. 4, in which case there will be no friction in its reciprocation except upon the pivot-pins; and it will also appear evident that it may be made with cells, as shown in Fig. 5, which will become loaded as they pass under the ports a, and discharge alternately at the front and rear as the valve B reciprocates. This form of the valve has the advantage of always keeping the port a closed against waste when the machine is not advancing.

Having described my invention, I claim as new—

1. A seed-box or hopper provided with a valve or valves reciprocating beneath the hopper, and adjusted to discharge the grain over its front and rear edges alternately.

2. A seed-box or hopper with a valve beneath, extending the whole length of said hopper, and reciprocating in the direction of the machine's line of advance, and adjusted to discharge the grain at the front and rear alternately, substantially as set forth.

3. A seed-box or hopper arranged transversely to the line of draft, with a valve reciprocating longitudinally with the line of draft, beneath it, as described, combined with flanges or platforms, movable or otherwise, to receive and scatter the seed as it is discharged from the port, for the purpose set forth.

4. A seed-box or hopper combined with a valve or valves reciprocating beneath said hopper, and provided with horizontal projecting flanges or platforms attached to and moving with said valve, to receive and scatter the seed, as set forth.

5. A seed-box or hopper arranged transversely to the line of draft, with a reciprocating valve beneath it, moving longitudinally with the line of draft, combined with independent guides to support said valve without frictional contact with the bottom of the hopper.

6. A seed-box or hopper arranged transversely to the line of draft, and a reciprocating valve beneath it in the direction of the line of draft, as shown, combined with guides D, supported by straps secured to the sides of said hopper.

7. A seed-box or hopper arranged transversely to the line of draft, and a valve extending the whole length thereof, and reciprocating in the direction of the machine's advance, combined with a gage and cut-off slide, C, as set forth.

8. The hopper A, constructed with the side openings for the admission of the draft-beam F, combined with a notched draft-beam and a wedging-key, f, to hold the parts securely together, as set forth.

HALSEY H. MONROE.

Witnesses:
R. D. O. SMITH,
C. CLARENCE POOLE.